United States Patent
Funatsu et al.

(10) Patent No.: US 10,138,153 B2
(45) Date of Patent: Nov. 27, 2018

(54) GLASS SUBSTRATE MOLDING METHOD

(71) Applicant: ASAHI GLASS COMPANY, LIMITED, Chiyoda-ku (JP)

(72) Inventors: Shiro Funatsu, Chiyoda-ku (JP); Keiichiro Uraji, Chiyoda-ku (JP); Junji Nishii, Sapporo (JP); Masashi Takei, Sapporo (JP); Yasushi Hirata, Sapporo (JP); Shoichi Mori, Sapporo (JP)

(73) Assignee: AGC Inc., Chiyoda-ku (JP)

( * ) Notice: Subject to any disclaimer, the term of this patent is extended or adjusted under 35 U.S.C. 154(b) by 154 days.

(21) Appl. No.: 15/395,638

(22) Filed: Dec. 30, 2016

(65) Prior Publication Data
US 2017/0107140 A1 Apr. 20, 2017

Related U.S. Application Data

(63) Continuation of application No. PCT/JP2015/070107, filed on Jul. 14, 2015.

(30) Foreign Application Priority Data

Jul. 18, 2014 (JP) .................. 2014-147299

(51) Int. Cl.
*C03B 13/08* (2006.01)
*C03B 23/00* (2006.01)
(Continued)

(52) U.S. Cl.
CPC .............. *C03B 13/16* (2013.01); *C03B 13/08* (2013.01); *C03B 23/02* (2013.01); *C03B 23/033* (2013.01);
(Continued)

(58) Field of Classification Search
CPC ..... C03B 13/08; C03B 13/16; C03B 23/0013; C03B 23/004; C03B 23/02;
(Continued)

(56) References Cited

U.S. PATENT DOCUMENTS 5,224,978 A * 7/1993 Hermant ................. C03B 13/08
65/255
5,853,446 A * 12/1998 Carre ................... B81C 1/00111
65/17.3

(Continued)

FOREIGN PATENT DOCUMENTS

CN 101360689 A 2/2009
FR 2 893 610 5/2007
(Continued)

OTHER PUBLICATIONS

International Search Report dated Oct. 6, 2015 in PCT/JP2015/070107, filed on Jul. 14, 2015 ( with English Translation).
(Continued)

*Primary Examiner* — Cynthia Szewczyk
(74) *Attorney, Agent, or Firm* — Oblon, McClelland, Maier & Neustadt, L.L.P.

(57) ABSTRACT

A glass substrate molding method includes: preparing a rotatable or wheelable molding die having a die surface and contacting the die surface with one of a pair of principal surfaces of a glass substrate made of a glass material containing an alkali metal oxide, the die having conductivity; keeping the one of principal surfaces contacted with the die surface at a temperature over 100° C. and equal to or lower than Tg+50° C.; applying direct-current voltage to the substrate to be higher voltage on the contacted one of principal surfaces than voltage on an opposite surface of the contacted one of principal surfaces; and rotating or wheeling the die and simultaneously moving the die or the substrate in a direction parallel to the contacted one of principal
(Continued)

surfaces in conformity with rotation or wheeling speed of the die, to mold the contacted one of principal surfaces of the substrate.

20 Claims, 7 Drawing Sheets

(51) Int. Cl.
| | |
|---|---|
| *C03C 19/00* | (2006.01) |
| *C03B 13/16* | (2006.01) |
| *C03C 15/00* | (2006.01) |
| *C03B 23/02* | (2006.01) |
| *C03C 3/087* | (2006.01) |
| *C03B 23/033* | (2006.01) |

(52) U.S. Cl.
CPC .............. *C03C 3/087* (2013.01); *C03C 15/00* (2013.01); *Y02P 40/57* (2015.11)

(58) Field of Classification Search
CPC .......... C03B 2215/404; C03B 2215/41; C03B 2215/412; C03C 19/00
USPC ........................................................... 65/102
See application file for complete search history.

(56) References Cited

U.S. PATENT DOCUMENTS

| | | | | |
|---|---|---|---|---|
| 5,987,923 | A * | 11/1999 | Ostendarp | ............... C03B 11/06 65/102 |
| 6,199,404 | B1 * | 3/2001 | Kawai | .................. C03C 17/002 427/383.5 |
| 2009/0162623 | A1 | 6/2009 | Foresti et al. | |
| 2010/0112341 | A1 | 5/2010 | Takagi et al. | |
| 2010/0154862 | A1 * | 6/2010 | Schiavoni | ............... C03B 13/08 136/246 |
| 2014/0120311 | A1 * | 5/2014 | Smith | ..................... C03C 15/00 428/141 |

FOREIGN PATENT DOCUMENTS

| | | |
|---|---|---|
| JP | 2009-517310 | 4/2009 |
| JP | 2009-161405 | 7/2009 |
| KR | 10-2008-0068094 | 7/2008 |
| KR | 10-2010-0014616 | 2/2010 |
| TW | 201442965 A | 11/2014 |
| WO | WO 2007/060353 A1 | 5/2007 |
| WO | WO 2008/123293 A1 | 10/2008 |
| WO | WO 2014/132983 A1 | 9/2014 |

OTHER PUBLICATIONS

Written Opinion dated Oct. 6, 2015 in PCT/JP2015/070107, filed on Jul. 14, 2015.

Naoki Ikutame et al., "Fabrication of nano-structure on a glass by electrostatic imprint process," The Japan Society of Applied Physics, Extended Abstracts of The 60th JSAP Spring Meeting, 2013, ISBN 978-4-86348-322-4, Mar. 11, 2013, pp. 2.

International Preliminary Report on Patentability and Written Opinion dated Feb. 2, 2017 in PCT/JP2015/070107 filed Jul. 14, 2015 (English translation).

* cited by examiner

GLASS SUBSTRATE MOLDING METHOD

CROSS-REFERENCE TO RELATED APPLICATIONS

This application is a continuation of prior International Application No. PCT/JP2015/070107, filed on Jul. 14, 2015 which is based upon and claims the benefit of priority from Japanese Patent Application No. 2014-147299, filed on Jul. 18, 2014; the entire contents of all of which are incorporated herein by reference.

FIELD

The present invention relates to a glass substrate molding method.

BACKGROUND

A display device such as a flat panel display or a projector is, for example, provided with optical elements, in front of and behind each pixel, having a lens function or a light scattering function owing to a fine concave-convex structure, in order to realize a highly bright image by transmitting more light. Further, in a micro-chemical analysis device or a chemical synthesis device which uses a MEMS (Micro Electro Mechanical System) or a fluid control system with the MEMS, a fine concave-convex structure is formed on a glass surface, and the glass and the fine structure are joined to manufacture a liquid flow path or various analysis reaction mechanisms. Thus, there is demanded an efficient method for forming a fine concave-convex structure on a glass surface in conformity with a purpose.

In order to manufacture a glass molded body having a fine pattern of a concave-convex shape on a surface thereof, there has been conventionally used a method of transferring a die for molding to form the fine pattern. This method is a method of transferring a fine pattern of a die surface to glass by pressing a planar molding die having the fine pattern of the concave-convex shape formed on the die surface thereof to the glass heated to a softening temperature (for example, see Patent Reference 1).

However, in this method, it is necessary that the glass and the molding die are heated to a high temperature enough to soften the glass, which requires a long time period for molding, leading to a problem that productivity is low and an operational cost is high. Besides, the molding die is required to be formed of a heat-resistant material excellent in durability at a high temperature, which leads to a problem that a cost of material constituting a molding apparatus becomes high. Further, in a cooling process after transferring, deformation may occur in the fine pattern having been transferred to the glass, resulting in difficulty in accurate transferring.

In order to solve the above problems and to mold glass without applying a large load, Patent Reference 2 suggests a following method. That is, there is suggested a method of heating a glass material and a planar molding die to a temperature T in a range of Tg−150° C.<T<Tg+100° C., in relation to a glass transition temperature Tg of the glass material, and while keeping the glass material and the planar molding die in contact, applying a direct-current voltage (preferably, 100 V or more and 2000 V or less) between the glass material and the molding die to generate electrostatic attraction force between a surface of the glass material and a surface of the molding die, to thereby perform pressure molding by the electrostatic attraction force.

However, in the method described in Patent Reference 2, though concave-convex structure of the fine pattern transferred to the glass have a difference in height of a certain degree, the difference in height is not sufficient yet. Further, in this method, since an area of a glass substrate to be subjected to a transfer processing is limited to be equal to or less than an area of a die surface of the molding die, a large-sized molding die is necessary in order to process a large-area glass substrate, which leads to a problem that an equipment cost is substantially increased.

Further, as a glass substrate for a cover glass of a liquid crystal display or the like, a glass substrate which does not deteriorate characteristics of various functional films is demanded. In other words, conventionally, in a case of a glass substrate for a cover glass of a display device such as a liquid crystal display, especially a glass substrate having a thin film of metal or oxide formed on a surface thereof, if alkali metal oxide is contained in the glass, alkali metal ions eluted on the surface of the glass are diffused in the thin film to deteriorate a film characteristic. Thus, alkali-free glass not containing an alkali metal ion practically is used. However, there is demanded a glass substrate which uses a normal glass substrate containing an alkali metal ion and is usable as the glass substrate for the cover glass of the liquid crystal display or the like similarly to the alkali-free glass substrate.

SUMMARY

Problems to be Solved by the Invention

The present invention is made to solve the above-described problems and aims at providing a molding method at a low cost even a large-area glass substrate. Particularly, the present invention aims at providing a method which transfers/forms a fine concave-convex pattern of a molding die to a principal surface of a large-area glass substrate at a low cost and increases a difference in height of concave-convex structure.

Means for Solving the Problems

A glass substrate molding method of the present invention includes: preparing a rotatable or wheelable molding die having a die surface and contacting the die surface with one of a pair of principal surfaces of a glass substrate made of a glass material containing an alkali metal oxide, the molding die having conductivity at least on the die surface; keeping the one of the pair of principal surfaces of the glass substrate contacted with the die surface at a temperature over 100° C. and equal to or lower than Tg+50° C., where Tg indicates a glass transition temperature of the glass material; applying a direct-current voltage to the glass substrate so as to be higher voltage on the contacted one of the pair of principal surfaces than voltage on an opposite surface of the contacted one of the pair of principal surfaces; and rotating or wheeling the molding die and simultaneously moving the molding die or the glass substrate in a direction parallel to the contacted one of the pair of principal surfaces of the glass substrate in conformity with a rotation speed or a wheeling speed of the molding die, to mold the contacted one of the pair of principal surfaces of the glass substrate. Further, a glass substrate molding method of the present invention includes: preparing a rotatable or wheelable molding die having a die surface and contacting the die surface with one of a pair of principal surfaces of a glass substrate made of a glass material containing an alkali metal oxide, the molding die having conductivity at least on the die surface; keeping the one of the pair of principal surfaces of the glass substrate contacted with the die surface at a temperature over 100° C. and equal to or lower than Tg+50° C., where Tg indicates a glass transition temperature of the glass material; applying a direct-current voltage to the glass substrate so as to be positive on the contacted one of the pair of principal surfaces and to be ground or negative on an opposite surface of the contacted one of the pair of principal surfaces; and rotating or wheeling the molding die and simultaneously moving the molding die or the glass substrate in a direction parallel to the contacted one of the pair of principal surfaces of the glass substrate in conformity with a rotation speed or a wheeling speed of the molding die, to mold the contacted one of the pair of principal surfaces of the glass substrate.

In the glass substrate molding method of the present invention, it is preferable that the molding die has a die surface with a fine pattern of a concave-convex shape. Further, in the applying the direct-current voltage, no corona discharge can be made to be generated between the die surface and the one of the pair of the principal surfaces. Further, it is preferable to further etching the contacted one of the pair of principal surfaces after molding the contacted one of the pair of principal surfaces of the glass substrate. Besides, it is preferable that the glass substrate is made of a glass material containing more than 15 mass % in total of an alkali metal oxide and an alkaline earth metal oxide. Further, it is preferable that, in the molding, the die surface of the molding die together with the contacted one of the pair of principal surfaces of the glass substrate is kept at a temperature over 100° C. and equal to or lower than Tg+50° C. Further, it is preferable that the direct-current voltage is in a range of 1 to 1000 V. Further, it is preferable that, in the molding, a pressure of 0.1 MPa to 10 MPa is applied to the contacted one of the pair of principal surfaces of the glass substrate. Besides, it is preferable that the molding is carried out in an atmosphere of mainly air or nitrogen. Further, it is preferable that the direct-current voltage is applied to the glass substrate disposed on a conductive base so as to be a positive electrode on the die surface of the molding die and to be ground or a negative electrode on the base.

Effect of the Invention

According to the molding method of the present invention, a large-area glass substrate can be molded without using a large-scale (large-area) molding die, so that molding at a low cost is possible. In particular, by using a molding die having a fine pattern of a concave-convex shape (hereinafter, sometimes referred to simply as a fine pattern or a concave-convex pattern) formed on a die surface thereof, it is possible to transfer the concave-convex pattern of the die surface to a contacted surface of the glass substrate accurately and to obtain a glass molded body with a sufficiently large difference in height of concave-convex structure at a low cost.

DETAILED DESCRIPTION

Hereinafter, an embodiment of the present invention will be described.

Figure 1:
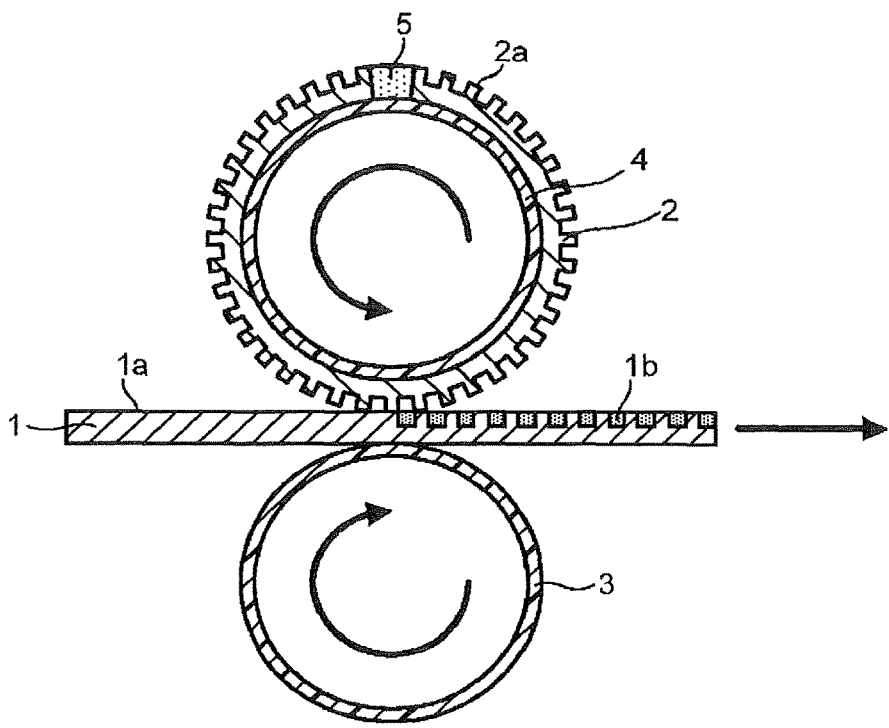
FIG. 1 is a view for explaining a molding method of the present invention.

In an embodiment of a glass substrate molding method of the present invention, as shown in FIG. 1, to a glass substrate 1 made of a glass material containing an alkali metal oxide and having a pair of principal surfaces, a rotatable or wheelable molding die 2 (hereinafter, referred to as a rotary molding die) which is formed so that at least a die surface 2a has conductivity, is held in a manner that the die surface 2a is contacted with one of a pair of the principal surfaces of the glass substrate 1. A contacted surface 1a being the principal surface of the glass substrate 1 where the die surface 2a of the rotary molding die 2 is contacted as above becomes a molded surface. It is preferable that a concave-convex pattern to be transferred to the glass substrate 1 is formed on the die surface 2a of the rotary molding die 2. Note that in FIG. 1, a reference numeral 3 indicates a base which is an electric conductor to be ground or a negative electrode, a reference numeral 4 indicates a support of the rotary molding die 2, and a reference numeral 5 indicates an insulation portion, respectively. Further, a reference numeral 1b indicates an alkali low concentration region 1b formed in the contacted surface 1a of the glass substrate 1. The alkali low concentration region 1b will be explained in detail later.

Hereinafter, examples of using the rotary molding die 2 having the die surface 2a with the concave-convex pattern formed thereon will be described. Though FIG. 1 shows the example in which the rotary molding die 2 is a roll type molding die rotating around a shaft (rotating on its axis), the rotary molding die may be an endless belt type molding die stretched between a plurality of rotary rolls. Such an endless belt type rotary molding die will be further explained in an item of molding apparatus described later.

While the die surface 2a of the rotary molding die 2 is contacted with one of the pair of the principal surfaces of the glass substrate 1, at least the contacted surface 1a of the glass substrate 1 is kept at a temperature T over 100° C. and equal to or lower than Tg+50° C. Tg indicates a glass transition temperature of a glass material constituting the glass substrate 1. In this state, while applying a direct-current voltage to the glass substrate 1 so as to be a positive potential on the contacted surface 1a of the pair of principal surfaces and to be ground or a negative potential on an opposite surface (hereinafter, referred to as a rear surface) of the contacted surface, the rotary molding die 2 is rotated around the shaft, and simultaneously, the rotary molding die 2 or the glass substrate 1 is moved in a direction parallel to the contacted surface 1a of the glass substrate 1 in conformity with a rotation speed of the rotary molding die 2. In this way, the contacted surface 1a of the glass substrate 1 is molded by the die surface 2a of the rotary molding die 2 while the direct-current voltage is being applied. In application of the direct-current voltage, it suffices that the contacted surface 1a side of the glass substrate 1 has a higher potential than that of the opposite surface side. Further, in molding a concave-convex pattern by contacting the rotary molding die 2 with the glass substrate 1, a pressing force at least over 0 (zero) is applied to the glass substrate 1 via the rotary molding die 2.

Incidentally, whichever may be firstly performed an operation of heating at least the contacted surface 1a of the glass substrate 1 to the above-described predetermined temperature or an operation of contacting the die surface 2a of the rotary molding die 2 with the contacted surface 1a of the glass substrate 1. In other words, the die surface 2a of the rotary molding die 2 may be contacted with one of the pair of the principal surfaces of the glass substrate 1 after the one of the pair of the principal surface of the glass substrate 1 is heated to the above-described predetermined temperature, and at least the contacted surface 1a of the glass substrate 1 may be heated to the above-described predetermined temperature after the die surface 2a of the rotary molding die 2 is contacted with one of the pair of the principal surfaces of the glass substrate 1.

In this way, the concave-convex pattern formed on the die surface 2a of the rotary molding die 2 is accurately transferred to the molded surface that is the contacted surface 1a of the glass substrate 1, so that a glass molded body having a fine pattern of a concave-convex shape formed on a surface thereof can be obtained.

In the present invention, the molded surface of the glass molded body obtained as above is preferable to be etched. By etching, it is possible to make a difference in height of concave-convex in the concave-convex pattern formed on the molded surface of the glass molded body larger.

In the embodiment of the present invention, a direct-current voltage of, for example, 100 V or less is applied in a state where at least the contacted surface 1a of the glass substrate 1, preferably the entire glass substrate 1, is heated to and kept at a temperature over 100° C. and equal to or lower than Tg+50° C., whereby the concave-convex pattern of the die surface 2a of the rotary molding die 2 is transferred accurately to the contacted surface 1a of the glass substrate 1. This is considered to be for reasons described below. Note that the "temperature of the glass substrate" means that at least the contacted surface 1a of the glass substrate 1, preferably the entire glass substrate 1, is at that temperature. Further, the temperature of the rotary molding die 2 also means, similarly, that at least the die surface 2a, preferably the entire rotary molding die 2, is at that temperature.

In other words, when the direct-current voltage is applied to the glass substrate 1 in a state where the glass substrate 1 (preferably the glass substrate 1 and the rotary molding die 2) is kept at the temperature over 100° C. and equal to or lower than Tg+50° C., in a surface layer portion on a positive electrode side, i.e., the contacted surface 1a side of the glass substrate 1, alkali metal ions contained in the glass material constituting the glass substrate 1 migrate toward the rear surface side that is ground or negative electrode (hereinafter, sometimes referred to as a negative electrode or the like) side. Incidentally, by application of the direct-current voltage, the alkaline earth metal ions contained in the glass material also migrate, but the alkali metal ions which are monovalent cations and have small ion radius are easy to migrate toward the rear surface side that is the side of the negative electrode or the like.

Figure 2A:
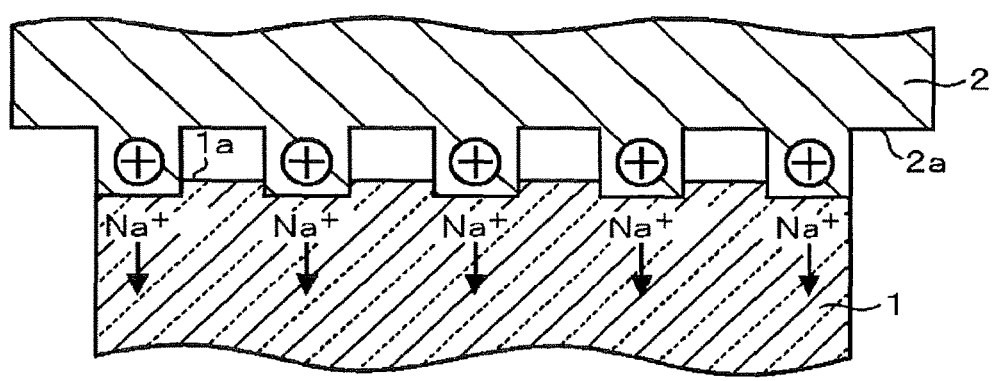
FIG. 2A is a diagram for explaining a relationship between migration of alkali metal ions by voltage application to a glass substrate and transferring of a concave-convex pattern by a molding die in an embodiment of the molding method of the present invention.
Figure 2B:
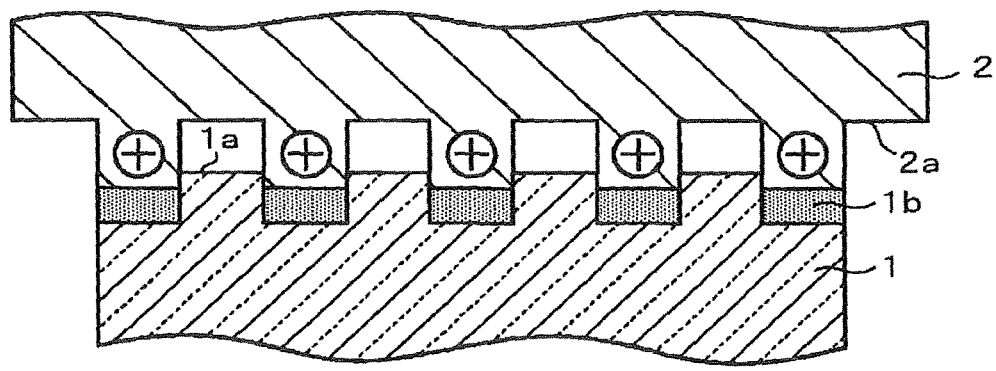
FIG. 2B is a diagram for explaining the relationship between migration of the alkali metal ions by voltage application to the glass substrate and transferring of the concave-convex pattern by the molding die in the embodiment of the molding method of the present invention.

Further, in the surface layer portion on the contacted surface 1a side of the glass substrate 1, a difference in electric field intensity between a concave portion and a convex portion of the die surface 2a of the rotary molding die 2 in contact with the surface layer portion generates a difference in degree of migration (migration length) and a difference in migration direction of the alkali metal ions. In other words, as shown in FIG. 2A, in the surface layer portion on the contacted surface 1a side of the glass substrate 1, the alkali metal ions migrate toward the side of the negative electrode or the like (rear surface side) in the region (hereinafter, referred to a first region) in contact with the convex portion of the die surface 2a of the rotary molding die 2, whereby, as shown in FIG. 2B, an alkali low concentration region 1b in which a content ratio of alkali metal ions is lower compared with a glass base material is formed. It is considered that the alkali low concentration region 1b formed in the first region is easy to buckle by pressurization and the alkali metal ions migrates to the side of the negative electrode or the like, whereby deformation of the glass is accelerated. Here, the glass base material means a glass material constituting a glass substrate in a state before being molded. In the glass substrate, a region other than the alkali low concentration region 1b after being molded has a glass composition almost the same as that of the glass base material.

Figure 2C:
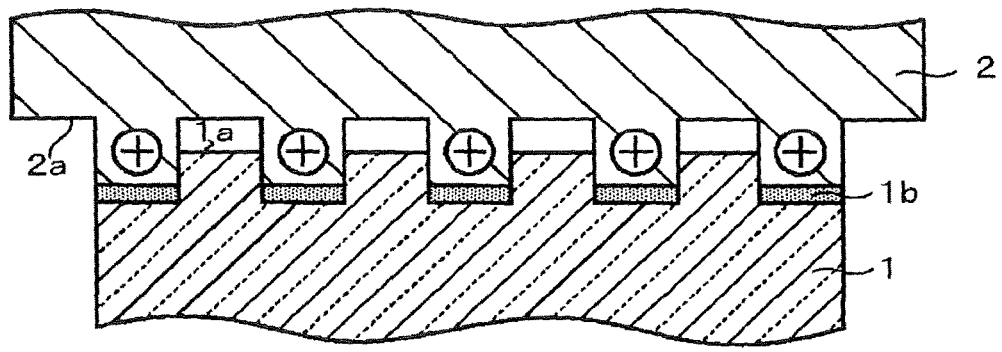
FIG. 2C is a diagram for explaining the relationship between migration of the alkali metal ions by voltage application to the glass substrate and transferring of the concave-convex pattern by the molding die in the embodiment of the molding method of the present invention.

In this way, molding of the glass substrate 1 is promoted, and as shown in FIG. 2C, on the molded surface that is the contacted surface 1a of the glass substrate 1, the concave-convex pattern in which the first region in contact with the convex portion of the die surface 2a of the rotary molding die 2 is a concave portion and the second region facing the concave portion of the die surface 2a is a convex portion is formed. Regarding operations of voltage application and pressurization at the time of molding, pressurization may be carried out in a state of voltage being applied, or voltage application may be carried out while pressurizing state continues, as will be described later.

As described above, in the glass molded body where the concave-convex pattern is transferred/formed by migration of alkali metal ions at the time of molding, the low concentration region of the alkali metal ions is formed in a vicinity of the surface of the concave portion of the molded surface. Here, the vicinity of the surface means a portion from the surface to a depth of 0.1 to 10 µm. Note that an alkali metal ion concentration in the vicinity of the surface of the convex portion of the molded surface is not different from that of the glass base material.

Incidentally, in a case where a glass substrate includes a plurality of kinds of alkali metal oxide in its composition, all the plurality of kinds of alkali metal ions migrate toward a ground electrode or negative electrode side, resulting in that each content concentration of the alkali metal ions becomes lower than that of the glass base material in the low concentration region of the alkali metal ions. However, since sodium ion is most easy to migrate, the alkali metal ions which migrate by the voltage application in the present invention are mainly sodium ion, so that the low concentration region of sodium ion is formed.

<Glass Substrate>

The glass substrate used in the molding method of the embodiment in the present invention is constituted by a glass material including alkali metal oxide in composition, that is, a glass base material. A composition of the glass base material is not limited in particular as long as being one having at least one kind of alkali metal oxide, but in view of ease in molding, the base material is preferable to contain over 15 mass % in total of alkali metal oxide and alkaline earth metal oxide.

As such a glass material, there can be cited glass containing, indicated by mass % in terms of oxide, 50 to 80% of $SiO_2$, 0.5 to 25% of $Al_2O_3$, 0 to 10% of $B_2O_3$, 10 to 16% of $Na_2O$, 0 to 8% of $K_2O$, 0 to 16% of $Li_2O$, 0 to 10% of CaO, 0 to 12% of MgO, and other than the above, less than 10% in total of SrO, BaO, $ZrO_2$, ZnO, $SnO_2$, $Fe_2O_3$ and so on. Hereinafter, each component constituting this glass will be described. Note that every "%" indicates "mass %".

$SiO_2$ is a component constituting a skeletal structure of glass. If a content ratio of $SiO_2$ is less than 50%, stability as glass may be decreased or weather resistance may be decreased. The content ratio of $SiO_2$ is preferably 60% or more. The content ratio of $SiO_2$ is more preferably 62% or more, and especially preferably 63% or more.

If the content ratio of $SiO_2$ is over 80%, viscosity of glass increases, and a melting property may be decreased significantly. The content ratio of $SiO_2$ is more preferably 76% or less, and further preferably 74% or less.

$Al_2O_3$ is a component to improve a migration speed of ions. If a content ratio of $Al_2O_3$ is less than 0.5%, the migration speed of ions may be decreased. The content ratio of $Al_2O_3$ is more preferably 1% or more, further preferably 2.5% or more, especially preferably 4% or more, and most preferably 6% or more.

If the content ratio of $Al_2O_3$ is over 25%, viscosity of glass becomes high and homogeneous melting may become difficult. The content ratio of $Al_2O_3$ is preferably 20% or less. The content ratio of $Al_2O_3$ is more preferably 16% or less, and especially preferably 14% or less.

$B_2O_3$ is not an essential component but is a component which may be contained for the sake of a melting property at a high temperature or improvement of glass strength. If $B_2O_3$ is contained, a content ratio thereof is preferably 0.5% or more, and further preferably 1% or more.

Further, the content ratio of $B_2O_3$ is 10% or less. $B_2O_3$ becomes easy to evaporate by coexistence with an alkali component, which may lead to difficulty in obtaining homogeneous glass. The content ratio of $B_2O_3$ is more preferably 6% of less, and further preferably 1.5% or less. In order to improve homogeneity of glass in particular, it is preferable that $B_2O_3$ is not contained.

$Na_2O$ is a component to improve a melting property of glass and has main ion (sodium ion) which migrates by application of the direct-current voltage. If a content ratio of $Na_2O$ is less than 10%, a migration effect of the sodium ion by the application of the direct-current voltage is hard to be obtained. The content ratio of $Na_2O$ is more preferably 11% or more, and especially preferably 12% or more.

The content ratio of $Na_2O$ is 16% or less. If the content ratio of $Na_2O$ is over 16%, the glass transition temperature Tg is lowered, making a strain point lower, which may result in deterioration of heat resistance or decrease of weather resistance. The content ratio of $Na_2O$ is more preferably 15% or less, further preferably 14% or less, and especially preferably 13% or less.

$K_2O$ is not an essential component, but is a component to improve a melting property of glass and a component easy to migrate by application of a direct-current voltage, and thus $K_2O$ may be contained. If $K_2O$ is contained, a content ratio thereof is preferably 1% or more, and further preferably 3% or more.

Further, the content ratio of $K_2O$ is 8% or less. If the content ratio of $K_2O$ is over 8%, weather resistance may be decreased. The content ratio of $K_2O$ is more preferably 5% or less.

$Li_2O$ is not an essential component similarly to $K_2O$, but is a component to improve a melting property of glass and a component easy to migrate by application of a direct-current voltage, and thus $Li_2O$ may be contained. If $Li_2O$ is contained, a content ratio thereof is preferably 1% or more, and further preferably 3% or more.

Further, the content ratio of $Li_2O$ is 16% or less. If the content ratio of $Li_2O$ is over 16%, a strain point may become too low. The content ratio of $Li_2O$ is more preferably 14% or less, and especially preferably 12% or less.

Alkaline earth metal oxide is a component to improve a melting property of glass and is a component effective in adjusting a glass transition temperature Tg.

Among the alkaline earth metal oxide, MgO is not an essential component, but is a component to raise a Young's modulus of glass to thereby improve strength and is a component to improve solubility. It is preferable to contain 1% or more of MgO. A content ratio of MgO is more preferably 3% or more, and especially preferably 5% or more. Further, the content ratio of MgO is 12% or less. If the content ratio of MgO is over 12%, stability of glass may be impaired. The content ratio of MgO is more preferably 10% or less, and especially preferably 8% or less.

CaO is not an essential component, but, if CaO is contained, a content ratio thereof is typically 0.05% or more. Further, the content ratio of CaO is 10% or less. If the content ratio of CaO is over 10%, a migration amount of alkali metal ions by application of a direct-current voltage may be decreased. The content ratio of CaO is more preferably 6% or less, further preferably 2% or less, and especially preferably 0.5% or less.

A total (total amount) of the content ratios of the alkali metal oxide and the alkaline earth metal oxide is preferable to be an amount of over 15%, in order to improve the melting property of the glass and to carry out stable voltage application by adjustment of the glass transition temperature Tg. The total of the content ratios of the alkali metal oxide and the alkaline earth metal oxide is more preferably 17% or more, especially preferably 20% or more, and an upper limit thereof is preferably 35% or less.

The glass constituting the glass substrate used in the molding method of the present invention may contain other components in a range not impairing the effect of the present invention. If such components are contained, a total of content ratios of such components is preferably 10% or less, and more preferably 5% or less. It is especially preferable that the glass is practically made of the above-describe components, that is, does not contain other components. Hereinafter, the above-described other components will be described by examples.

SrO may be contained as necessary, but SrO increases a specific gravity of glass compared with MgO and CaO, a content ratio thereof is preferably less than 1% in view of decrease in weight of the material. The content ratio of SrO is more preferably less than 0.5%, especially preferably less than 0.2%.

Since BaO has the largest action to increase a specific gravity of glass among the alkaline earth metal oxide, BaO is preferably not contained, or a content ratio thereof is preferably less than 1% even in a case of being contained, in view of decrease in weight of the material. The content ratio of BaO is more preferably less than 0.5%, and especially preferably less than 0.2%.

If SrO and BaO are contained, a total of content ratios thereof is preferably less than 1%. The total of the content ratios of SrO and BaO is more preferably less than 0.5%, and especially preferably less than 0.2%.

$ZrO_2$ is not an essential component, but is a component which may be contained in order for improvement of chemical resistance of glass. If $ZrO_2$ is contained, a content ratio thereof is more preferably 0.1% or more, further preferably 0.3% or more, and especially preferably 1.5% or more.

In order to improve a melting property of glass at a high temperature, ZnO can be sometimes contained, for example, up to 2%, but a content ratio thereof is preferably 1% or less. In a case of manufacturing glass by a float process, it is preferable that the content ratio thereof is set to 0.5% or less. If the content ratio of ZnO is over 0.5%, reduction may occur in float molding, causing a product defect. Typically, ZnO is not contained.

If $SnO_2$ is contained, a content ratio thereof is preferably less than 0.5%. If the content ratio of $SnO_2$ is 0.5% or more, stability of glass may be impaired. The content ratio of $SnO_2$ is more preferably less than 0.1%, and especially preferably less than 0.05%.

Further, glass containing these respective components may contain $SO_3$, chloride, fluoride, or the like properly, as a clarifying agent at the time of melting.

Incidentally, a glass transition temperature Tg of such glass is preferably in a range of about 500 to 700° C. However, a glass transition temperature Tg of the glass material constituting the glass substrate used in the molding method of the present invention is not limited to the above-described range.

A shape of the glass substrate constituted by such glass is not limited in particular as long as being a shape having a pair of principal surfaces parallel to each other. The shape may be a planer shape in which the pair of principal surfaces are flat planes, or may be a curved shape in which the pair of principal surfaces are curved surfaces. In this specification, such planar-shaped or curved-shaped glass substrate is referred to as the glass substrate, and in the following description, molding of the glass substrate will be explained.

A thickness of the glass substrate is not limited in particular. It is possible to use a glass substrate with a thickness of, for example, 1 µm to 5 mm in correspondence with use of a glass molded body.

<Molding Apparatus>

Figure 3:
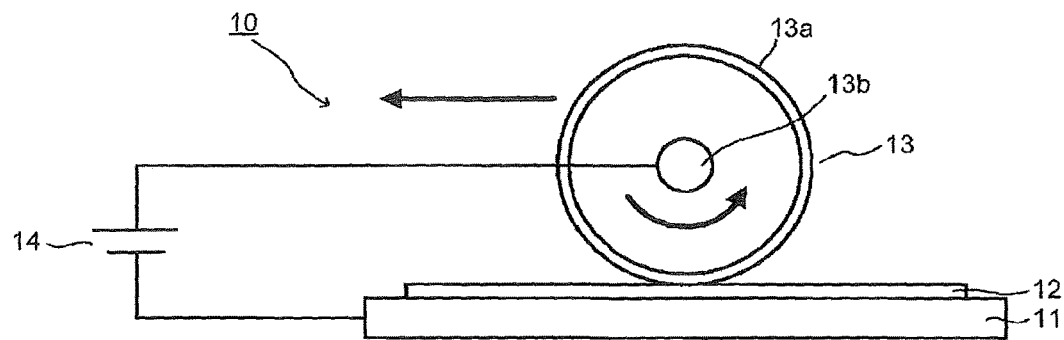
FIG. 3 is a diagram showing a schematic configuration of a first example of a molding apparatus used in the molding method of the present invention.

A first example of the molding apparatus used in the molding method of the present invention will be shown in FIG. 3. FIG. 3 is a diagram schematically showing a configuration of a molding apparatus 10.

The molding apparatus 10 has a base 11 having electric conductivity, a glass substrate 12 disposed on the base 11 in a manner that one of the pair of principal surfaces (for example, a lower surface) of the glass substrate 12 is in contact with the base 11, a roll type molding die 13 held in a manner that an outer peripheral surface which is a die surface 13a of the molding die 13 is contacted with the opposite principal surface (for example, an upper surface, which is also referred to as a molded surface) of the glass substrate 12, an electric heater (not shown) disposed in contact with or in a vicinity of the glass substrate 12 and the roll type molding die 13 in order to heat and keep the glass substrate 12 and the roll type molding die 13 at a predetermined temperature, and a direct-current power supply 14 for applying a direct-current voltage to the glass substrate 12 so as to be a ground electrode or a negative electrode on the conductive base 11 and to be a positive electrode on the die surface 13a of the roll type molding die 13.

Further, the molding apparatus 10 has a rotating mechanism (not shown) rotating the roll type molding die 13 around its shaft 13b, and a molding die moving mechanism (not shown) moving the roll type molding die 13 in parallel to the molded surface of the glass substrate 12 while keeping a state where the die surface 13a of the roll type molding die 13 is contacted with the molded surface of the glass substrate 12. Further, the molding apparatus 10 may have a pressurizing mechanism which presses the die surface 13a of the roll type molding die 13 to the molded surface of the glass substrate 12. In FIG. 3, a rotational direction of the roll type molding die 13 and a moving direction of the roll type molding die 13 are respectively indicated by arrows.

Here, a rotation speed of the roll type molding die 13 is adjustable by its roll diameter, and a moving speed of the roll type molding die 13 is adjusted in synchronicity with the rotation speed.

The molding apparatus 10 as above is disposed in a chamber (not shown) kept in a nitrogen atmosphere or the like. Note that if molding is carried out in the air, the chamber is not included in a configuration. Further, a mechanism to heat and keep the glass substrate 12 and the roll type molding die 13 at a predetermined temperature is not limited to the electric heater as long as the mechanism can heat and keep the glass substrate 12 and so on at the predetermined temperature.

Hereinafter, each member or the like constituting the molding apparatus 10 as above will be further described.

(Base)

The base 11 where the glass substrate 12 is placed is constituted by a conductive material, and the base 11 is ground or a negative electrode to which a direct-current voltage is applied at the time of molding. The conductive material constituting the base 11 preferably has mechanical strength to withstand a later-described pressurizing force.

As such conductive materials, there can be cited metal such as silver, copper, aluminum, chromium, titanium, tungsten, palladium, and stainless steel as well as alloys thereof; tungsten carbide (WC), silicon carbide (SiC), carbon, and so on. In view of mechanical strength, WC, SiC, and stainless steel such as SUS304 and SUS318 are preferable, and in view of cost, carbon is preferable.

The base 11 to be the ground or the negative electrode is preferable to have a shape and a structure to be in contact with an entire rear surface (surface on an opposite side to the molded surface) of the glass substrate 12. The shape and structure as above lead to homogeneous application of an electric field to the inside of the glass substrate 12, promoting migration of alkali metal ions. Further, as described later, it is possible to use, as the base 11, a plurality of small rolls aligned in a manner that each axis thereof is parallel to the rotary shaft 13b of the roll type molding die 13. In other words, it is also possible to dispose the glass substrate 12 on the base 11 constituted by the small rolls as above and to connect the direct-current power supply 14 so that an entire aggregate of the small rolls becomes ground or the negative electrode. Further, it is also possible to use the base 11 constituted by the aggregate of small rolls as above, to convey the glass substrate 12, and to move the glass substrate 12 in a horizontal direction parallel to the molded surface thereof.

(Roll Type Molding Die)

The direct-current power supply 14 is connected to the rotary shaft 13b of the roll type molding die 13, and the die surface 13a of the roll type molding die 13 to be the positive electrode is electrically connected to the rotary shaft 13b. Such a configuration enables application of the electric field having sufficient strength to the inside of the glass substrate 12 by applying a positive voltage to the molded surface of the glass substrate 12 which is in contact with the die surface 13a of the roll type molding die 13.

Further, the roll type molding die 13 has the fine pattern of the concave-convex shape formed on the die surface 13a in contact with the glass substrate 12. The roll type molding die 13 is also preferable to be constituted by a material having mechanical strength withstanding the later-described pressurizing force. Further, in order to be able to apply a predetermined positive voltage to the molded surface (contacted surface) of the glass substrate 12, at least the die surface 13a is constituted by a conductive material. The roll type molding die 13 as a whole including the die surface 13a that is a roll surface is preferable to be constituted by a material having mechanical strength and durability. Here, examples of the conductive material include metal such as nickel, chromium, molybdenum, and stainless steel including SUS304 and SUS318 as well as alloys thereof, noble metal such as platinum, iridium, and rhodium, carbon, SiC, and WC. Further, a conductive organic material can be used as long as being a material having heat resistance exceeding a heating temperature of the roll type molding die 13.

Incidentally, on the die surface 13a of the roll type molding die 13, it is preferable to provide a heat insulation layer made of ceramics on both sides of a region where the principal surface of the glass substrate 12 is contacted, in order to prevent thermal deformation of a roll supporting portion.

Regarding the roll type molding die 13, the entire roll type molding die 13 may be formed of the above-described conductive material, or a thin film made of the above-described conductive material may be formed in a covering manner on at least a die surface of a cylindrical die main body formed of an insulating material such as $SiO_2$, and the conductive thin film may be electrically connected to the positive electrode of the direct-current power supply 14 as described above.

In the molding method of the embodiment of the present invention, since the glass substrate 12 is molded at a sufficiently low temperature equal to or lower than Tg+50° C. and by application of a sufficiently low voltage (for example, 1000 V or less), a problem does not occur that the die surface 13a of the roll type molding die 13 and the contacted surface (molded surface) of the glass substrate 12 are joined. Further, while the roll type molding die 13 is being rotated, the roll type molding die 13 is moved in the direction parallel to the contacted surface of the glass substrate 12 in conformity with the rotation speed thereof to thereby carry out molding, and hence it is not necessary to use a large-sized molding die even for a large-area glass substrate 12, enabling molding at a low cost.

A level difference of concave-convex (which means a difference in height between a surface of the concave portion and a surface of the convex portion, and is referred to as a "die level difference" hereinafter) of the fine pattern formed on the die surface 13a of the roll type molding die 13 is preferably 100 nm or more, more preferably 200 nm or more, further preferably 1 µm or more, and especially preferably 10 µm or more. An electric field pattern applied to the glass substrate 12 becomes more distinct as a distance between the surface of the concave portion on the die surface 13a of the roll type molding die 13 and the contacted surface (molded surface) of the glass substrate 12 is larger, and thus a degree of glass deformation of the glass substrate 12 promoted by migration of alkali metal ions in a portion to be in contact with the convex portion of the die surface 13a of the roll type molding die 13 becomes large. Further, in view of ease in fabrication of the roll type molding die 13, the die level difference of the fine pattern is preferably 100 µm or less, more preferably 50 µm or less, and further preferably 20 µm or less.

At this time, the difference in height of concave-convex formed on the contacted surface (molded surface) of the glass substrate 12 does not depend on a pitch of the fine pattern of the die surface 13a, and is preferably 1 to 200 nm, more preferably 5 to 100 nm, further preferably 10 to 85 nm, and especially preferably 20 to 50 nm. The die level difference of the die surface 13a of the roll type molding die 13 described above is larger than a difference in height of concave-convex formed on the contacted surface (molded surface) of the glass substrate 12. In this way, molding to the molded surface of the glass substrate 12 becomes possible at the sufficiently low temperature of Tg+50° C. and by application of the sufficiently low voltage.

The pitch of the fine pattern formed on the die surface 13a of the roll type molding die 13 is preferably 50 nm to 50 µm, more preferably 100 nm to 10 µm, and further preferably 300 nm to 900 nm.

Next, other examples of the molding apparatus usable to the present invention will be shown in FIGS. 4 to 9. Also by the molding apparatuses, the fine pattern of the concave-convex shape formed on the die surface of the rotary molding die can be transferred accurately to the molded surface of the glass substrate, similarly to in a case where the molding apparatus shown in FIG. 3 is used.

Incidentally, in FIG. 4 to FIG. 9, the same reference numeral is given to the same member as that in the molding apparatus shown in FIG. 3, and the same reference numeral is given to the same member also in respective drawings. Further, a rotational direction of the rotary molding die and a moving direction of the base or the like on which the glass substrate is mounted are indicated by arrows. Further, in FIG. 5 to FIG. 9, the direct-current power supply is omitted.

Second and Third Examples

Figure 4:
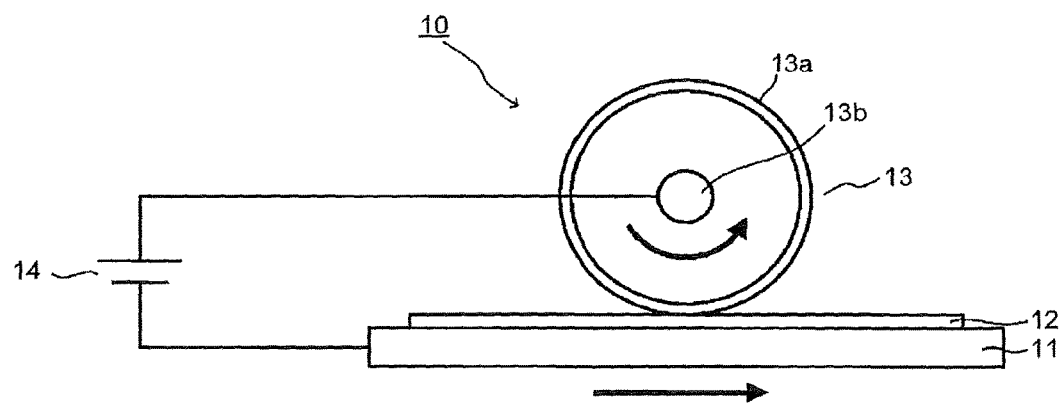
FIG. 4 is a diagram showing a schematic configuration of a second example of the molding apparatus used in the molding method of the present invention.
Figure 5:
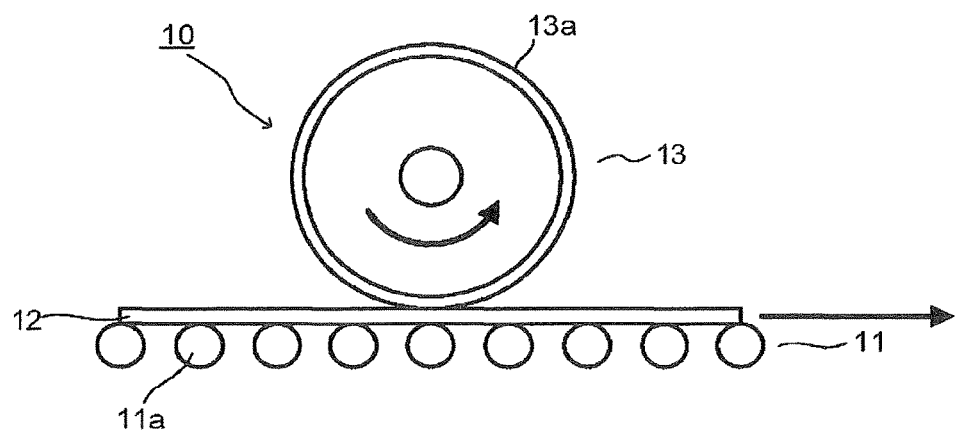
FIG. 5 is a diagram showing a schematic configuration of a third example of the molding apparatus used in the molding method of the present invention.

In a second example of the molding apparatus 10, as shown in FIG. 4, a glass substrate conveying mechanism (not shown) is provided to a conductive base 11 on which a glass substrate 12 is mounted. The glass substrate conveying mechanism is configured to convey the glass substrate 12 in a horizontal direction (indicated by an arrow) parallel to a molded surface while keeping a state where the glass substrate 12 is contacted with a die surface 13a of a roll type molding die 13.

It suffices that the glass substrate conveying mechanism is a mechanism capable of moving the conductive base 11 in the horizontal direction parallel to a mounting surface thereof while the glass substrate 12 is kept mounted. As shown as a third example in FIG. 5, by configuring a base 11 by aligning multiple conductive small rolls 11a to thereby make each small roll 11a rotate on its axis, the base 11 itself that is an aggregate of the multiple small rolls 11a may be used as the glass substrate conveying mechanism.

Fourth Example

Figure 6:
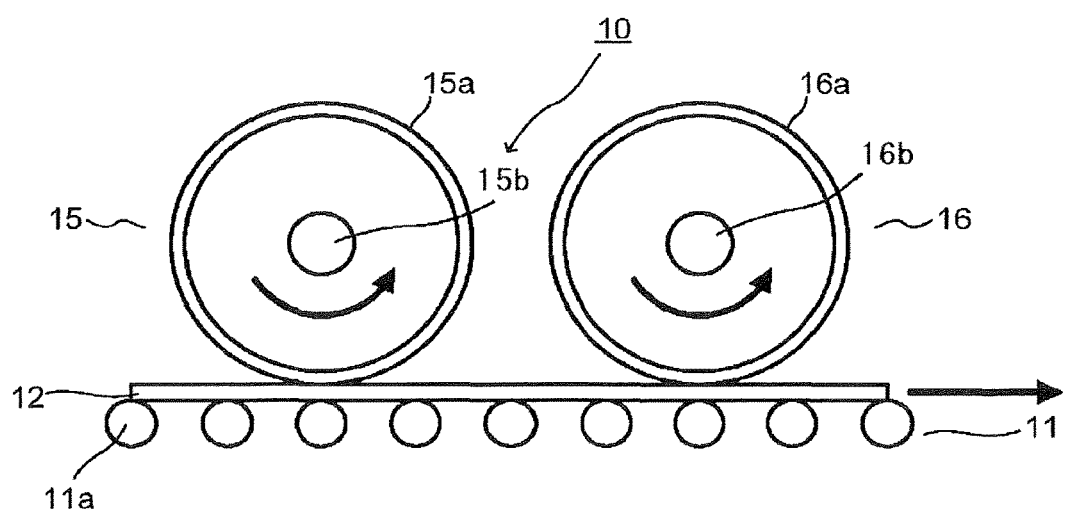
FIG. 6 is a diagram showing a schematic configuration of a fourth example of the molding apparatus used in the molding method of the present invention.

In a fourth example of the molding apparatus, as shown in FIG. 6, a plurality of (for example, two) roll type molding dies 15, 16 are aligned at a predetermined interval, and the roll type molding dies 15, 16 are rotationally driven around rotary shafts 15b, 16b at each disposed position. The molding apparatus is configured that a base 11 constituted by an aggregate of small rolls 11a functions as a glass substrate conveying mechanism to convey a glass substrate 12 in a horizontal direction parallel to a molded surface thereof.

In the molding apparatus 10 as above, if the plurality of roll type molding dies 15, 16 are different in arrangement shape or depth of concave-convex patterns formed on the die surfaces 15a, 16a, a combined pattern of the concave-convex patterns of the respective die surfaces 15a, 16a of the plurality of the roll type molding dies 15, 16 is transferred to the glass substrate 12. Therefore, there is an advantage of increasing a degree of freedom of the concave-convex pattern formed on the molded surface of the glass substrate 12.

Fifth Example

Figure 7:
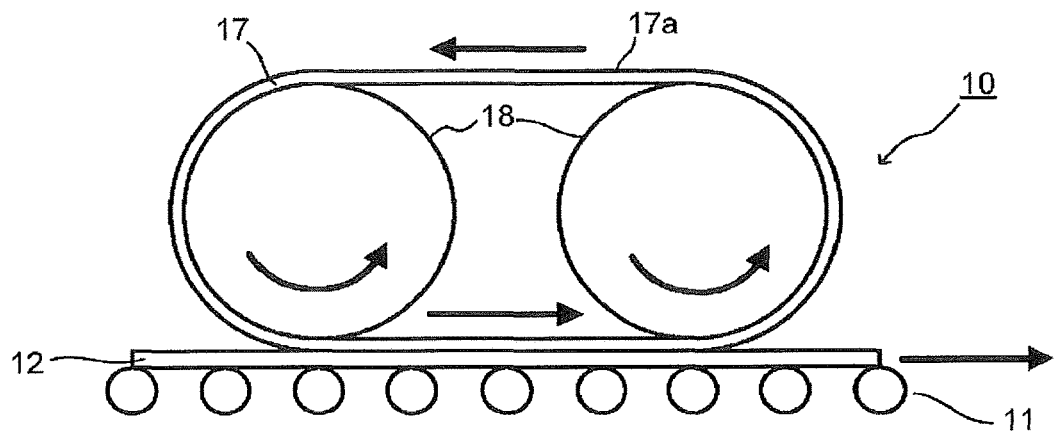
FIG. 7 is a diagram showing a schematic configuration of a fifth example of the molding apparatus used in the molding method of the present invention.

In a fifth example of the molding apparatus 10, as shown in FIG. 7, a belt type molding die 17 is used instead of the roll type molding die. The belt type molding die 17 is a belt type die which is configured to be stretched between a plurality of (for example, two) rotary rolls 18 and to wheel endlessly along outer peripheral surfaces of the rotary rolls 18 in correspondence with rotation of the rotary rolls 18. Further, the belt type molding die 17 has a fine pattern of a concave-convex shape on a die surface 17a that is an outer peripheral surface thereof, and it is configured to convey a glass substrate 12 in a horizontal direction parallel to a molded surface thereof by a base 11 functioning as a glass substrate conveying mechanism similarly to the third example, in a state where the die surface 17a is contacted with the molded surface of the glass substrate 12.

Sixth and Seventh Example

Figure 8:
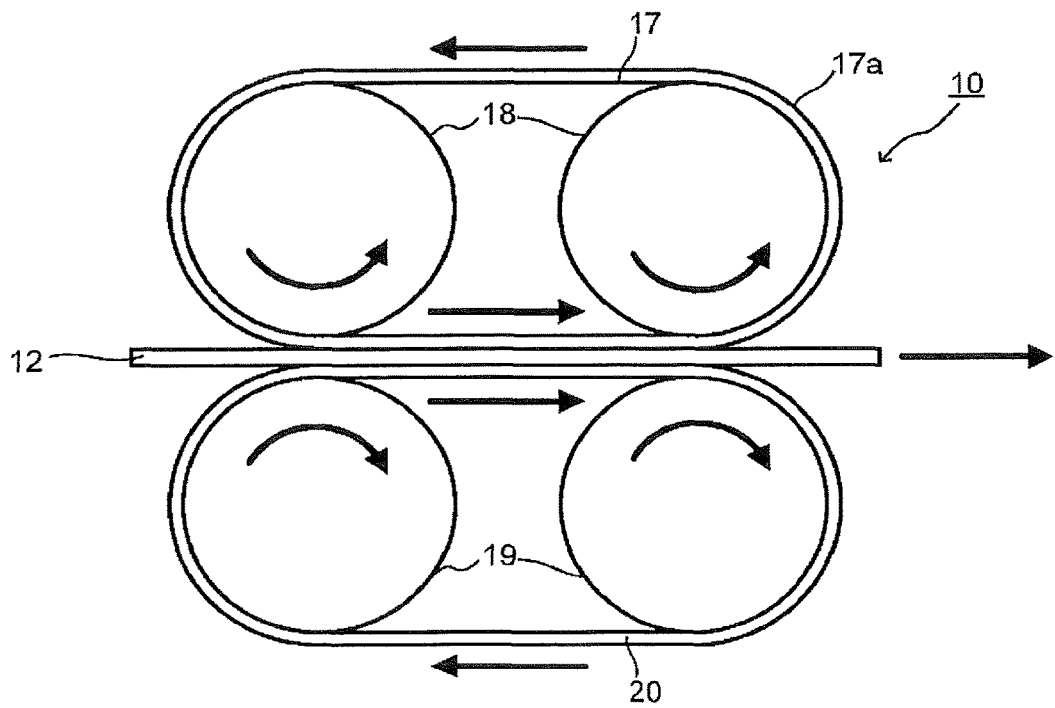
FIG. 8 is a diagram showing a schematic configuration of a sixth example of the molding apparatus used in the molding method of the present invention.
Figure 9:
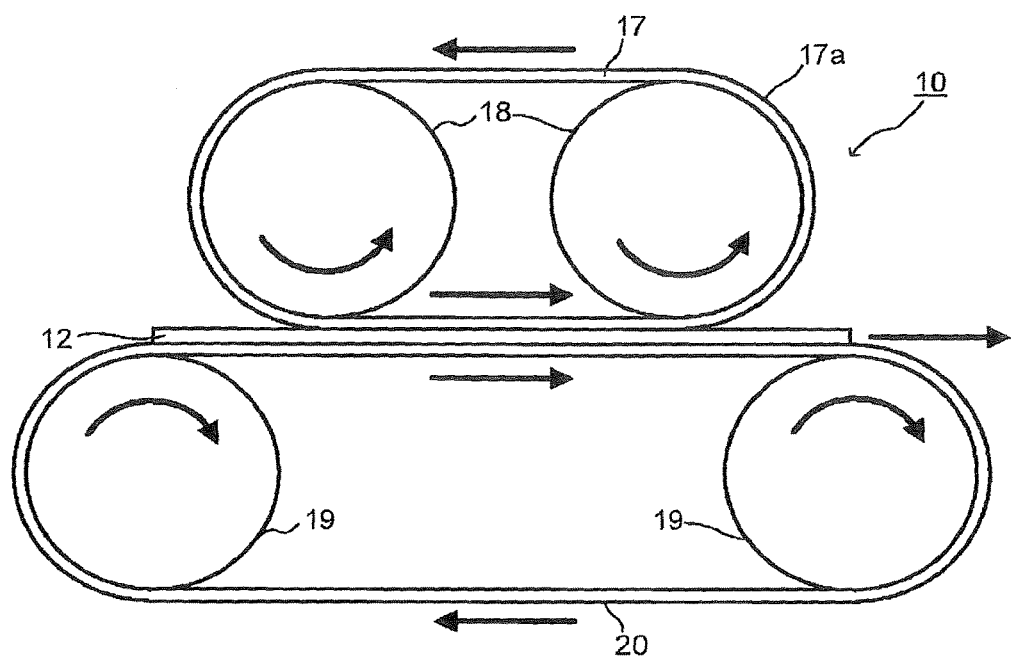
FIG. 9 is a diagram showing a schematic configuration of a seventh example of the molding apparatus used in the molding method of the present invention.

In a sixth example of the molding apparatus 10 shown in FIG. 8 and in a seventh example shown in FIG. 9, the belt type molding dies 17 are each used as a rotary molding die similarly to the fifth example. Further, as a glass substrate conveying mechanism, there is provided a conveyer belt 20 which is stretched between a plurality of (for example, two) base side rotary rolls 19 and endlessly wheels and moves along outer peripheral surfaces of the base side rotary rolls 19 in correspondence with rotation of the base side rotary rolls 19. The molding apparatus 10 is configured that a glass substrate 12 is disposed on the conveyer belt 20 and that the glass substrate 12 is conveyed in a horizontal direction parallel to a molded surface thereof. Further, the conveyer belt 20 is constituted by a conductive material and is connected to a direct-current power supply so as to become ground or a negative electrode.

Here, a diameter of a rotary roll 18 which drives the belt type molding die 17 is not necessarily required to be equal to a diameter of the base side rotary roll 19 which drives the conveyer belt 20, but a moving speed of the conveyer belt 20, that is, a speed to convey the glass substrate 12 in the horizontal direction, is required to be adjusted in synchronicity with a wheeling speed of the belt type molding die 17 in order to contact a die surface 17a of the belt type molding die 17 with the molded surface of the glass substrate 12 without slipping.

Further, a length of the belt type molding die 17 in contact with the molded surface of the glass substrate 12 as a positive electrode is preferably equal to a length of the conveyer belt 20 in contact with a rear surface of the glass substrate 12 as the ground or the negative electrode as shown in FIG. 8 in view of an efficiency of molding, but it is possible to make the length of the conveyer belt 20 in contact with the rear surface of the glass substrate 12 longer as shown in FIG. 9.

Eighth Example

An eighth example of the molding apparatus is an apparatus to mold a principal surface of a thin (for example, 0.3 mm or less in thickness) sheet-shaped glass substrate (hereinafter, referred to as a glass sheet). This molding apparatus is configured, as shown in FIG. 10, to make a glass sheet 12a travel continuously along a die surface 13a of a roll type molding die 13 disposed at a predetermined position, to hold a surface on an opposite side of a contacted surface of the glass sheet 12a by a conductive base 11 at a portion in contact with the die surface 13a of the roll type molding die 13, and to apply a direct-current voltage so as to be a positive electrode on the roll type molding die 13 and to be ground or a negative electrode on the base 11.

Figure 10:
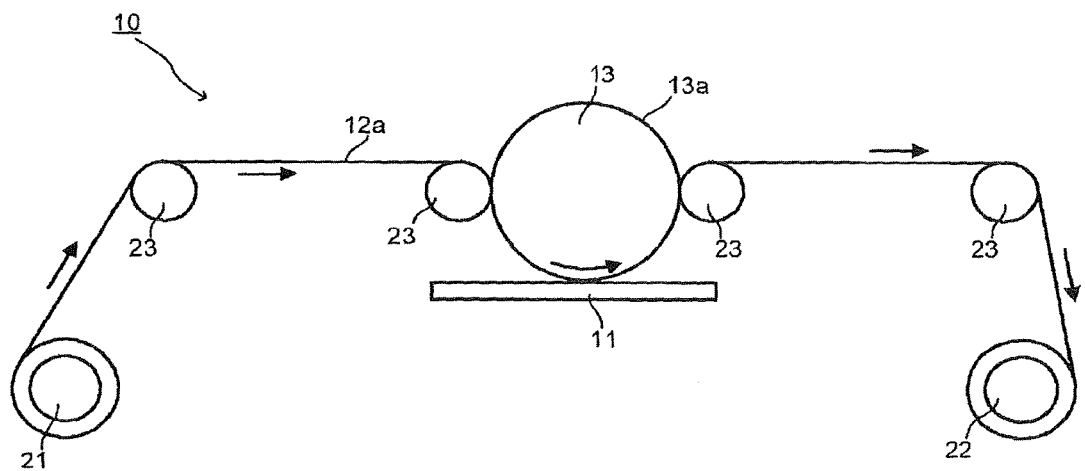
FIG. 10 is a diagram showing a schematic configuration of an eighth example of the molding apparatus used in the molding method of the present invention.

Incidentally, in FIG. 10, a reference numeral 21 indicates a feeding roll, a reference numeral 22 indicates a winding roll (receiving roll), and a reference numeral 23 indicates a guide roll. Further, a traveling direction of the glass sheet 12a is indicated by an arrow.

Next, conditions (a temperature of a glass substrate, an applied voltage, a molding atmosphere) of molding in the embodiment of the present invention will be described. It is preferable to carry out molding under the molding conditions described below not only in a case of using the molding apparatus of the first example but also in a mode of using any of the molding apparatuses of the second to eighth examples.

(Temperature of Glass Substrate)

A temperature T of a glass substrate 12 is set to be higher than 100° C. and equal to or lower than Tg+50° C. when a glass transition temperature of a glass material is Tg. That is, the temperature T is set to satisfy 100° C.$<T \leq Tg+50°$ C. Note that this temperature is a temperature of the molded surface of the glass substrate 12, and a portion other than the molded surface of the glass substrate 12 is not necessarily required to be set at the above temperature, but in view of a heating efficiency and an efficiency of a molding operation, it is preferable that the entire glass substrate 12 is heated to the temperature higher than 100° C. and equal to or lower than Tg+50° C. Further, in view of ease in molding, it is preferable to heat also the roll type molding die 13 or the belt type molding die 17 that is the rotary molding die to the same temperature as that of the glass substrate 12.

Setting the temperature T of the glass substrate 12 to be higher than 100° C. facilitates migration of alkali metal ions in the glass material, to thereby form an alkali low concentration region in a surface layer portion in the molded surface of the glass substrate 12, enabling easy molding. Further, setting the temperature T of the glass substrate 12 to be equal to or lower than Tg+50° C. enables suppression of deformation of the glass material other than the molded surface to be minimum and decreases thermal damage to the roll type molding die 13 or the belt type molding die 17 (hereinafter, referred to as the rotary molding die) being the rotary molding die, enabling simplification of a heating and heat shielding structure. If the temperature T of the glass substrate 12 is set to be equal to or lower than Tg−50° C. deformation owing to viscosity of glass can be suppressed, and an electric current flowing in the glass substrate 12 can be suppressed from being high. Further, if the temperature T is set to be equal to or lower than Tg−150° C., the die surface 13a of the roll type molding die 13 or the die surface 17a of the belt type molding die 17 does not come into an oxidation atmosphere of a high temperature, resulting in that conductive materials constituting the molding dies hardly corrode. Therefore, a good mold release property to glass and a practical die life can be obtained.

(Applied Voltage)

It is preferable that a direct-current voltage of 1 to 1000 V is applied to the glass substrate 12 so as to be the ground or the negative electrode on the aforementioned conductive base 11 or conveyer belt 20 and to be the positive electrode on the die surface 13a of the roll type molding die 13 or the die surface 17a of the belt type molding die 17 (hereinafter, referred to as a die surface of a rotary molding die). Even with the voltage of 1000 V or less, the alkali metal ions contained in the composition of glass constituting the glass substrate 12 migrate in the glass toward the surface (rear surface) side in contact with the base 11 or the conveyer belt 20 that is the ground or the negative electrode, at the surface layer portion on the molded surface side close to the positive electrode of the glass substrate 12. Consequently, the alkali low concentration region is formed in the surface layer portion of the predetermined region (first region in contact with the convex portion of the die surface of the rotary molding die) of the molded surface of the glass substrate 12, enabling molding at the temperature higher than 100° C. and equal to or lower than Tg+50° C.

Further, as a result of setting the applied voltage in the above voltage range, dielectric breakdown does not occur between the glass substrate 12 and the rotary molding die, and between the above and other composing members of the molding apparatus, enabling simplification of an insulating structure, so that molding by a small-sized and simple apparatus becomes possible. Further, the applied voltage of 1000 V or less has an advantage that a release film is not consumed when the release film is formed on the die surface of the rotary molding die. An upper limit of the applied voltage is more preferably 800 V or less, more preferably 600 V or less, more preferable 500 V or less, and further preferable 300 V or less. The applied voltage is more preferably 100 to 300 V, and further preferably 200 to 300 V.

A time period during which the direct-current voltage is applied is preferably 10 to 900 seconds, more preferably 10 to 300 seconds, and further preferably 60 to 200 seconds, though depending on the applied voltage, the die level difference of the die surface of the rotary molding die, the difference in height of concave-convex formed on the contacted surface of the glass substrate 12, and so on.

As a method to transfer a concave-convex pattern of a die surface of a molding die to a contacted surface of a glass substrate more accurately, it is preferable to generate no corona discharge between the die surface of the molding die and the glass substrate. An applied voltage in this case is preferably 100 to 300 V and a time period of application is preferably 60 to 900 seconds. Further, in this case, if the difference in height of concave-convex of the molding die is not sufficient, a moving speed of the glass substrate and a speed of rotating or wheeling the molding die are better to be decreased and the time period of application is better to be long. The time period of application in this case is more preferably 300 to 900 seconds. This is considered that since a weak electric current flows even after polarization occurs in the glass substrate, a supplied electric amount becomes larger as the time period of application is longer, to thereby facilitate etching. Here, a state where the no corona discharge is generated means a state where rapid change owing to discharge of a direct current is not detected.

(Molding Atmosphere)

An atmosphere in which molding of the glass substrate 12 is carried out, for example, an atmosphere inside a chamber where the molding apparatus 10 is disposed is not required to be a vacuum atmosphere or a rare gas atmosphere such as argon, and an atmosphere mainly of air or nitrogen is preferable. The atmosphere mainly of nitrogen is more preferable. Here, the "atmosphere mainly of air or nitrogen" means a gas state in which a content ratio of air or nitrogen is over 50 vol % of the entire atmosphere gas. Molding in the atmosphere mainly of air or nitrogen enables miniaturization and simplification of an apparatus and improves a degree of freedom of an apparatus configuration, compared with a case of molding in vacuum or in rare gas.

(Pressurizing Force)

A pressurizing mechanism to the molded surface of the glass substrate 12 is not limited in particular as long as being a mechanism capable of pressing the die surface of the rotary molding die to the molded surface of the glass substrate 12 by pressurizing the rotary molding die with a load from the outside. Further, pressurizing to the molded surface of the glass substrate 12 may be done by the own weight of the rotary molding die without using the pressurizing mechanism in particular. By pressurizing, it becomes possible to carry out molding stably in a shorter time period. A pressurizing force is preferably in a range of 0.1 MPa to 10 MPa. Setting the pressurizing force to the above range brings about secure contacting the molded surface of the glass substrate 12 with the die surface of the rotary molding die without damaging the glass substrate 12 and the rotary molding die, enabling transferring the fine pattern of the die surface to the molded surface of the glass substrate 12 accurately. The pressurizing force is preferably 5 MPa or less, more preferably 4 MPa or less, and further preferably 3 MPa or less.

Pressurizing may be carried out before application of the direct-current voltage, but it is preferable to continue the pressurizing till voltage application or to carry out the pressurizing in a state where the voltage is being applied. Further, in order for efficient molding, it is preferable to keep the rotary molding die for a predetermined time period in a state of being pressurized. A pressurizing time period is preferably about 10 to 250 seconds, and more preferably 60 to 200 seconds, though depending on the applied voltage in the above-described voltage application, the die level difference of the die surface of the rotary molding die, the difference in height of concave-convex formed on the contacted surface of the glass substrate 12, and so on.

As described above, according to the embodiment of the present invention, as a result of heating and keeping the glass substrate 12 and the rotary molding die at the temperature over 100° C. and equal to or lower than Tg+50° C. and of applying the sufficiently low direct-current voltage, the fine pattern of the concave-convex shape formed on the die surface of the rotary molding die can be accurately transferred to the molded surface that is the contacted surface of the glass substrate 12. Besides, it is possible to obtain the glass molded body having the concave-convex pattern formed on the molded surface with high shape accuracy and to realize molding at a lower cost compared with a conventional method. If the glass substrate 12 and the rotary molding die are heated to a temperature lower than the glass transition temperature Tg of the glass material constituting the glass substrate 12 by 150° C. or more, a heat shielding structure and a heat insulating structure of the apparatus can be simplified and a covering layer for protection or the like formed on the die surface of the rotary molding die can be constituted by a material lower in heat resistance and corrosion resistance compared with a conventional material, so that miniaturization of the apparatus and decrease in cost of a composing material become possible. Further, deterioration of the rotary molding die due to heat is suppressed and the life of the rotary molding die is prolonged, which leads to decrease of a cost and saves a time required for exchange of the rotary molding die, resulting in improvement of productivity.

Further, since it is also possible to decrease pressuring (application of the load) from the outside in molding, breakage of the glass substrate 12 or the rotary molding die due to pressurizing can be prevented. Besides, since the fine pattern is transferred in a state before the glass material is softened, deformation does not occur in the glass material in the portion other than the molded surface to which the fine pattern is transferred, resulting in high transferring accuracy. In particular, by electric field concentration, a large force acts on a portion, to which application of a load is difficult by an ordinary method, such as a corner portion of the fine pattern of the die surface of the rotary molding die, so that more accurate transferring and molding are possible.

According to the embodiment of the molding method of the present invention, it is possible to obtain the glass molded body which has the fine pattern of the concave-convex shape formed on the molded surface thereof and the alkali low concentration region formed in the surface layer portion of the concave portion of the molded surface. In the fine pattern of the concave-convex shape formed on the molded surface of the glass molded body, the level difference (hereinafter, referred to as a glass level difference) that is the difference in height of concave-convex can be set to a range of 1 to 200 nm.

Incidentally, as described above, the alkali low concentration region is a region in which a content concentration of sodium ions is ordinarily lower than another region, that is, lower than that of the glass base material, and concretely, a region in which the content concentration of the sodium ions is, for example, 1/10 or less of an initial value (glass base material) in terms of mole can be the alkali low concentration region. Here, the content concentration of the sodium ion is, for example, a value measured by TOF-SIMS (time-of-flight secondary ion mass spectrometry). As the alkali low concentration region as above, the glass molded body obtained in the present invention has a region deeper than a depth of the concave portion buckled by the convex portion of the die surface of the rotary molding die.

<Etching Process>

By carrying out etching using an etching solution for the glass molded body obtained by the molding method of the present invention as above, it is possible to make the glass level difference that is the difference in height of concave-convex larger in the fine pattern of the concave-convex shape formed on the molded surface. This is considered that an etching rate of the surface layer portion of the concave portion is large since the surface layer portion of the concave portion of the molded surface of the glass molded body is lower in alkali concentration compared with the surface layer portion of the convex portion of the molded surface.

A principal constituent of the etching solution is preferably one kind or two or more kinds selected from KOH, HF, BHF, HCl, mixture of HF and KF, mixture of HF and KCl, mixture of HF and $H_2SO_4$, and HF and $NH_4F$ and organic acid (for example, acetic acid). The principal constituent is more preferably KOH, HF, or BHF, and most preferably KOH.

Since productivity (etching efficiency) is higher as a solid content concentration in the etching solution becomes higher, the solid content concentration in the etching solution is preferably 1 mass % to 65 mass %. The solid content concentration is more preferably 10 mass % to 60 mass %.

Since productivity is higher as a temperature of the etching solution at the time of etching becomes higher, the temperature of the etching solution at the time of etching is preferably 10° C. to 100° C. The temperature of the etching solution is more preferably 20° C. to 80° C.

A time period to immerse the glass substrate into the etching solution is preferably within 48 hours, more preferably within 24 hours, still more preferably within 16 hours, further preferably within 12 hours, and especially preferably within 5 hours, though depending on the composition of the glass and the concave-convex shape to be formed.

An etching method can be selected from methods such as immersion, stirring, and spraying. The spraying method is preferable since the spraying method promotes a flow of etchant on a glass surface to thereby be able to make the difference in height of concave-convex larger.

For the fine pattern of the concave-convex shape formed on the molded surface of the glass molded body obtained by etching, it is possible to make the glass level difference that is the difference in height of concave-convex double to 100 times the glass level difference formed on the molded surface of the glass molded body before etching. The magnification is preferably 2 to 50 times, and more preferably 2 to 10 times. The glass level difference after etching can be made concretely in a range of 10 to 3000 nm. The glass level difference is preferably 20 to 1000 nm, more preferably 40 to 850 nm, and further preferably 100 to 500 nm.

A pitch of the fine pattern formed on the molded surface of the glass molded body obtained by etching is preferably 50 nm to 50 μm, and more preferably 100 nm to 10 μm, and further preferably 300 nm to 900 nm.

EXAMPLES

Hereinafter, examples of the present invention will be described concretely, but the present invention is not limited to these examples.

Examples 1 to 3

As the glass substrate, there was used a substrate (manufactured by ASAHI GLASS CO., LTD., whose principal surface is a rectangle of 30 mm×80 mm and whose thickness is 1.0 mm) of soda lime glass (whose glass transition temperature Tg is 555° C.) containing, in mass % in terms of oxide, 70% of $SiO_2$, 2% of $Al_2O_3$, 13% of $Na_2O$, 10% of CaO, 4% of MgO, and less than 1% in total of $K_2O$, $Fe_2O_3$, and $SO_3$. Further, as the roll type molding die, one made of stainless steel (SUS304) which is 30 mm in diameter and 30 mm in effective width in axial direction was used. Incidentally, a die surface having a concave-convex pattern of 100 μm in width of a convex portion, 330 μm in width of a concave portion, 430 μm in pitch of the convex portion, and 100 μm in height (level difference) of the convex portion was formed on a roll surface of the roll type molding die. The roll type molding die and the aforementioned glass substrate were set in the molding apparatus 10 shown in FIG. 3, and subjected to an air atmosphere.

Next, in a state where the die surface of the roll type molding die was contacted with an upper surface (molded surface) of the glass substrate, the glass substrate and the roll type molding die were heated to 500° C. (<Tg+50° C.) and a direct-current voltage of 400 V in Example 1, of 450 V in Example 2, and of 500 V in Example 3 was applied so as to be a negative electrode on a base under the glass substrate and to be a positive electrode on the roll type molding die. Then, while the roll type molding die was rotated, the roll type molding die was moved in a direction parallel to the molded surface of the glass substrate and along a long edge of the glass substrate at a speed of 0.02 mm/sec. As described above, the roll type molding die that was being rotated was moved along the long edge of the glass substrate for 50 minutes to thereby carry out molding of the entire principal surface of the glass substrate.

For the glass molded bodies obtained as above, the glass level difference that is difference in height of concave-convex transferred and formed on the molded surface was measured. Measurement results are shown in Table 1.

Further, the obtained glass molded bodies were immersed in a KOH aqueous solution of concentration of 55 mass % kept at 70° C. for predetermined time periods (10 hours and 20 hours) so that the molded surface was etched, and the glass level difference of the molded surface after etching was measured. Measurement results are shown in Table 1. Incidentally, the measurements of the glass level difference before etching and after etching were carried out by using an atomic force microscope.

TABLE 1

| | | Glass level difference (nm) | | |
| | | | After etching | |
| Heating temperature (° C.) | Applied voltage (V) | Before etching | Etching for 10 hours | Etching for 20 hours |
| Example 1 | 500 | 400 | 200 | 220 | 250 |
| Example 2 | 500 | 450 | 200 | 870 | 1330 |
| Example 3 | 500 | 500 | 200 | 1350 | 1800 |

Figure 11:
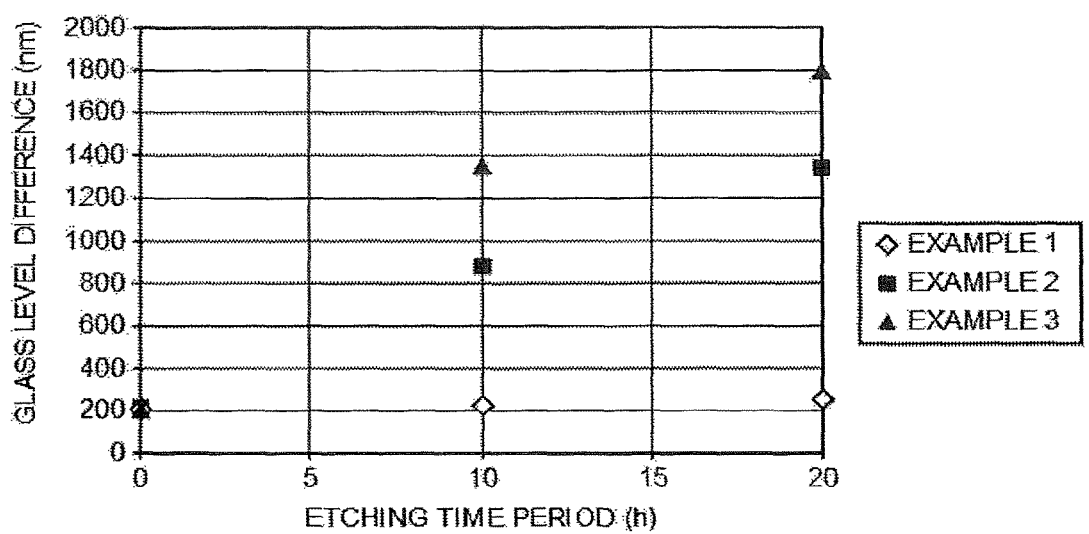
FIG. 11 is a graph showing relationships between etching time period and level difference of concave-convex structure (glass level difference) formed on the molded surface of the glass substrate in Examples 1 to 3.

Further, the measurement results of the glass level difference are shown in a graph of FIG. 11, with a horizontal axis indicating an etching time period.

The measurement results of Table 1 and the graph of FIG. 11 indicate the following. In other words, by using the roll type molding die having the concave-convex pattern on the die surface, the direct-current voltage of 400 to 500 V is applied while the roll type molding die is heated at the predetermined heating temperature to mold the concave-convex of the glass substrate, whereby it is possible to obtain the glass molded body whose glass level difference being the difference in height of concave-convex is sufficiently high. Further, the glass level difference of the molded body becomes larger by etching. It is found that particularly in a case where the applied voltage is 450 V and 500 V, the glass level difference linearly increases in a large way with increase of the etching time period.

Examples 4 to 8

As the glass substrate, there was used a substrate (manufactured by ASAHI GLASS CO., LID., whose principal surface is a rectangle of 10 mm×10 mm and whose thickness is 1.0 mm) of soda lime glass (whose glass transition temperature Tg is 555° C.) having the same composition as those of Examples 1 to 3. A die surface having a concave-convex pattern of 60 μm in width of a convex portion, 360 μm in width of a concave portion, 420 μm in pitch of the convex portion, and 40 μm in height (level difference) of the convex portion was formed on a roll surface of a molding die. The molding die and the aforementioned glass substrate were set in the molding apparatus 10 shown in FIG. 3, and subjected to a nitrogen atmosphere.

Next, in a state where the die surface of the roll type molding die was contacted with an upper surface (molded surface) of the glass substrate, the glass substrate and the molding die were heated to 350° C. in Example 4, 400° C. in Example 5, 450° C. in Example 6, 500° C. in Example 7, and 550° C. in Example 8, a direct-current voltage of 200 V was applied for 840 seconds so as to be a negative electrode on a base under the glass substrate and to be a positive electrode on the molding die, and pressurizing to 3 MPa is carried out with a pressure rising time of 30 seconds. Thereby, the concave-convex is molded on the glass substrate. During the above, rapid change due to discharge of a direct-current was not detected and corona discharge was not generated.

Further, the obtained glass molded bodies were immersed in a KOH aqueous solution of concentration of 55 mass % kept at 70° C. for 10 hours so that the molded surface was etched, and the glass level difference of the molded surface after etching was measured by a surface roughness tester.

As a result, under all the heating conditions (Examples 4 to 8), grooves which have glass level difference of about 1 μm and are relatively faithful to shape of the molding die can be formed. For the heating temperatures of 350, 400, 450, 500, and 550° C., electricity quantities were, in sequence, 12, 27, 24, 22, 21 millicoulomb (mC). Note that the electricity quantities are larger than 16 to 17 millicoulomb in the case where corona discharge was generated by the voltage of 400 V, the application time period of 90 seconds, and the heating temperature of 350 to 500° C., except in the case of the heating temperature of 350° C.

INDUSTRIAL APPLICABILITY

According to a molding method of the present invention, a fine pattern of a concave-convex shape formed on a die surface of a rotary molding die such as a roll type molding die can be accurately transferred to a molded surface of a glass substrate, so that a glass molded body having a concave-convex pattern with high shape accuracy can be obtained at a lower cost compared with a conventional method. Therefore, application to various fields is possible, such as to various optical components including an optical element used for a display device, an optical control device using a MEMS, and a micro-chemical analysis device.

What is claimed is:

1. A glass substrate molding method, comprising:
   preparing a rotatable or wheelable molding die having a die surface and contacting the die surface with one of a pair of principal surfaces of a glass substrate made of a glass material containing an alkali metal oxide, the molding die having conductivity at least on the die surface;
   keeping the one of the pair of principal surfaces of the glass substrate contacted with the die surface at a temperature over 100° C. and equal to or lower than Tg+50° C., where Tg indicates a glass transition temperature of the glass material;
   applying a direct-current voltage to the glass substrate so as to be higher voltage on the contacted one of the pair of principal surfaces than voltage on an opposite surface of the contacted one of the pair of principal surfaces; and
   rotating or wheeling the molding die and simultaneously moving the molding die or the glass substrate in a direction parallel to the contacted one of the pair of principal surfaces of the glass substrate in conformity with a rotation speed or a wheeling speed of the molding die, to mold the contacted one of the pair of principal surfaces of the glass substrate.

2. The glass substrate molding method according to claim 1,
   wherein the molding die has a die surface with a fine pattern of a concave-convex shape.

3. The glass substrate molding method according to claim 1,
   wherein the applying the direct-current voltage generates no corona discharge between the die surface and the one of the pair of principal surfaces.

4. The glass substrate molding method according to claim 1, further comprising
   etching the contacted one of the pair of principal surfaces after molding the contacted one of the pair of principal surfaces of the glass substrate.

5. The glass substrate molding method according to claim 1,
   wherein the glass substrate is made of a glass material containing more than 15 mass % in total of an alkali metal oxide and an alkaline earth metal oxide.

6. The glass substrate molding method according to claim 1,
   wherein, in the molding, the die surface of the molding die together with the contacted one of the pair of principal surfaces of the glass substrate is kept at a temperature over 100° C. and equal to or lower than Tg+50° C.

7. The glass substrate molding method according to claim 1,
   wherein the direct-current voltage is in a range of 1 to 1000 V.

8. The glass substrate molding method according to claim 1,
   wherein, in the molding, a pressure of 0.1 MPa to 10 MPa is applied to the contacted one of the pair of principal surfaces of the glass substrate.

9. The glass substrate molding method according to claim 1,
   wherein the molding is carried out in an atmosphere of mainly air or nitrogen.

10. The glass substrate molding method according to claim 1,
    wherein the direct-current voltage is applied to the glass substrate disposed on a conductive base so as to be a positive electrode on the die surface of the molding die and to be ground or a negative electrode on the base.

11. A glass substrate molding method, comprising:
    preparing a rotatable or wheelable molding die having a die surface and contacting the die surface with one of a pair of principal surfaces of a glass substrate made of a glass material containing an alkali metal oxide, the molding die having conductivity at least on the die surface;
    keeping the one of the pair of principal surfaces of the glass substrate contacted with the die surface at a temperature over 100° C. and equal to or lower than Tg+50° C., where Tg indicates a glass transition temperature of the glass material;
    applying a direct-current voltage to the glass substrate so as to be positive on the contacted one of the pair of principal surfaces and to be ground or negative on an opposite surface of the contacted one of the pair of principal surfaces; and
    rotating or wheeling the molding die and simultaneously moving the molding die or the glass substrate in a direction parallel to the contacted one of the pair of principal surfaces of the glass substrate in conformity with a rotation speed or a wheeling speed of the molding die, to mold the contacted one of the pair of principal surfaces of the glass substrate.

12. The glass substrate molding method according to claim 11,
    wherein the molding die has a die surface with a fine pattern of a concave-convex shape.

13. The glass substrate molding method according to claim 11,
    wherein the applying the direct-current voltage generates no corona discharge between the die surface and the one of the pair of principal surfaces.

14. The glass substrate molding method according to claim 11, further comprising
    etching the contacted one of the pair of principal surfaces after molding the contacted one of the pair of principal surfaces of the glass substrate.

15. The glass substrate molding method according to claim 11,
    wherein the glass substrate is made of a glass material containing more than 15 mass % in total of an alkali metal oxide and an alkaline earth metal oxide.

16. The glass substrate molding method according to claim 11,
    wherein, in the molding, the die surface of the molding die together with the contacted one of the pair of principal surfaces of the glass substrate is kept at a temperature over 100° C. and equal to or lower than Tg+50° C.

17. The glass substrate molding method according to claim 11,
    wherein the direct-current voltage is in a range of 1 to 1000 V.

18. The glass substrate molding method according to claim 11,
    wherein, in the molding, a pressure of 0.1 MPa to 10 MPa is applied to the contacted one of the pair of principal surfaces of the glass substrate.

19. The glass substrate molding method according to claim 11,
    wherein the molding is carried out in an atmosphere of mainly air or nitrogen.

20. The glass substrate molding method according to claim 11,
wherein the direct-current voltage is applied to the glass substrate disposed on a conductive base so as to be a positive electrode on the die surface of the molding die and to be ground or a negative electrode on the base.

* * * * *